United States Patent [19]

Stanesic

[11] Patent Number: 5,308,134

[45] Date of Patent: May 3, 1994

[54] HEAVY TRUCK BUG AND GRAVEL SHIELD

[75] Inventor: John M. Stanesic, Johnston, Iowa

[73] Assignee: DFM Corporation, Urbandale, Iowa

[21] Appl. No.: 39,645

[22] Filed: Mar. 30, 1993

[51] Int. Cl.⁵ ............................................. B60J 1/20
[52] U.S. Cl. .................................. 296/91; 296/180.1
[58] Field of Search .............................. 296/91, 180.2

[56] References Cited

U.S. PATENT DOCUMENTS

| | | | |
|---|---|---|---|
| 3,015,517 | 1/1962 | Thornburgh | 296/91 |
| 3,163,389 | 12/1964 | Thornburgh | 248/211 |
| 3,934,923 | 1/1976 | Lissaman et al. | 296/180.2 |
| 4,153,129 | 5/1979 | Redmond | 180/68 P |
| 4,357,045 | 11/1982 | Kinford, Jr. | 296/180.2 |
| 4,627,657 | 12/1986 | Daniel et al. | 296/91 |
| 4,842,319 | 6/1989 | Ziegler et al. | 296/91 |

Primary Examiner—Robert R. Song
Attorney, Agent, or Firm—Zarley, McKee, Thomte, Voorhees & Sease

[57] ABSTRACT

A heavy duty truck bug and gravel shield that has minimum parts and a maximum deflecting ability. It also is designed to minimize shield vibration.

12 Claims, 3 Drawing Sheets

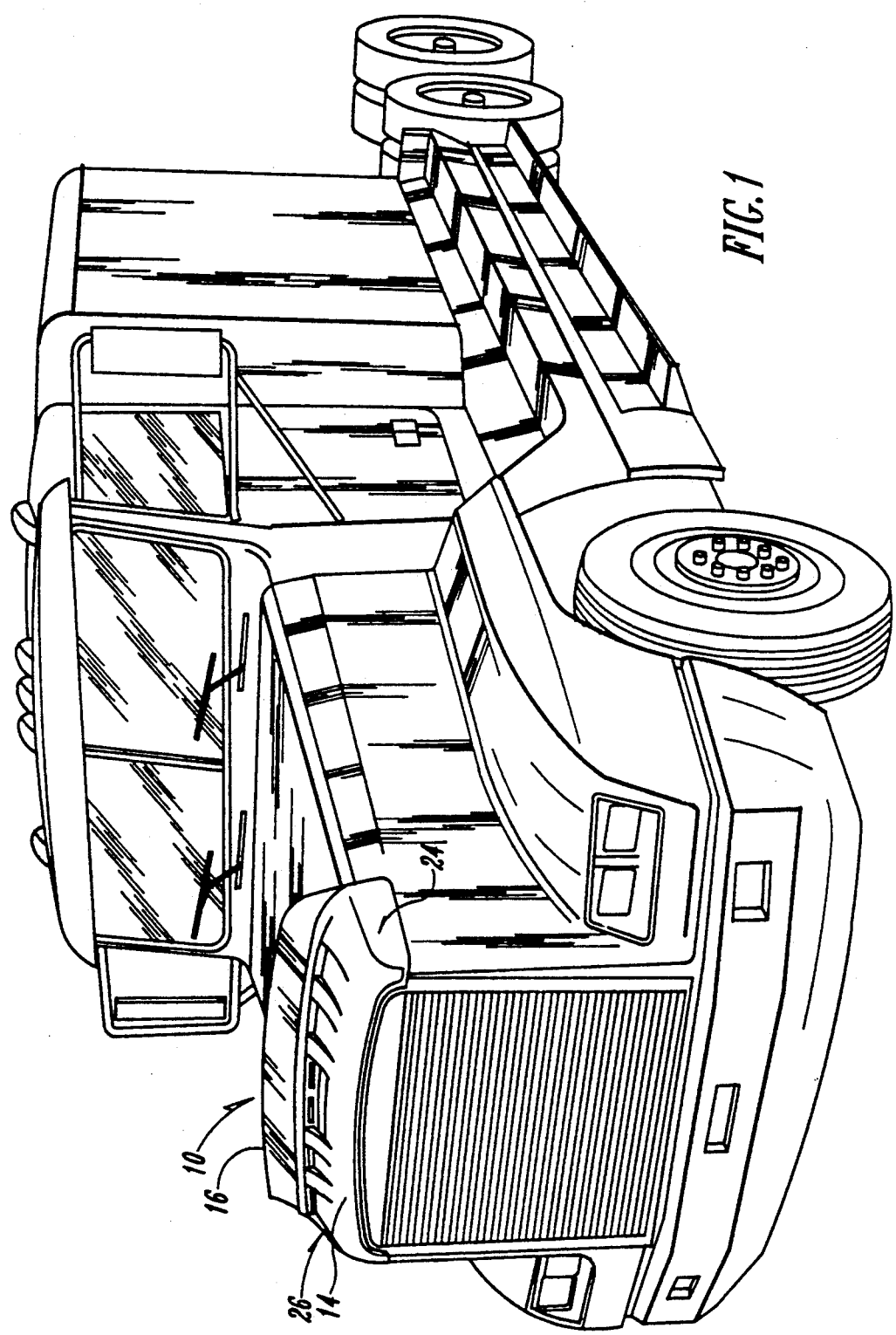

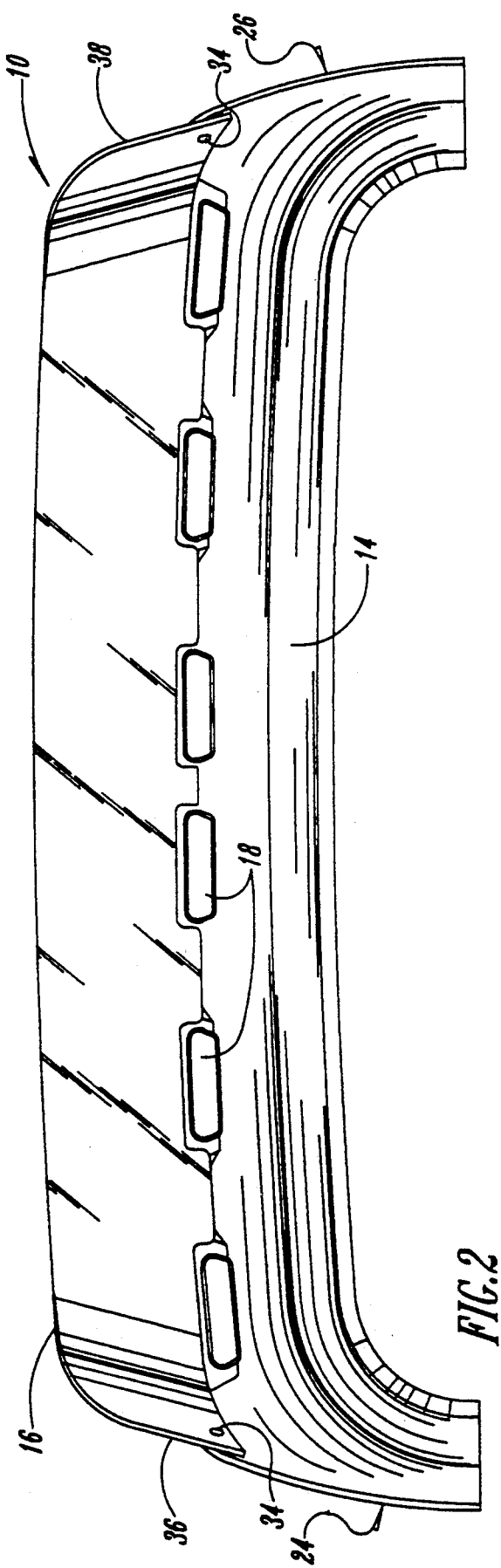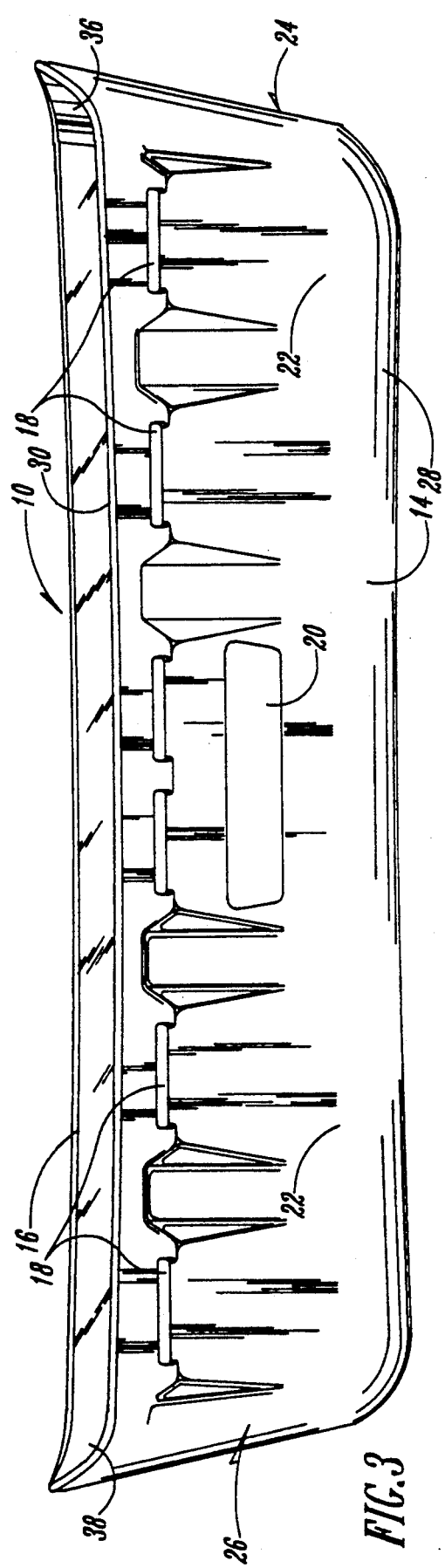

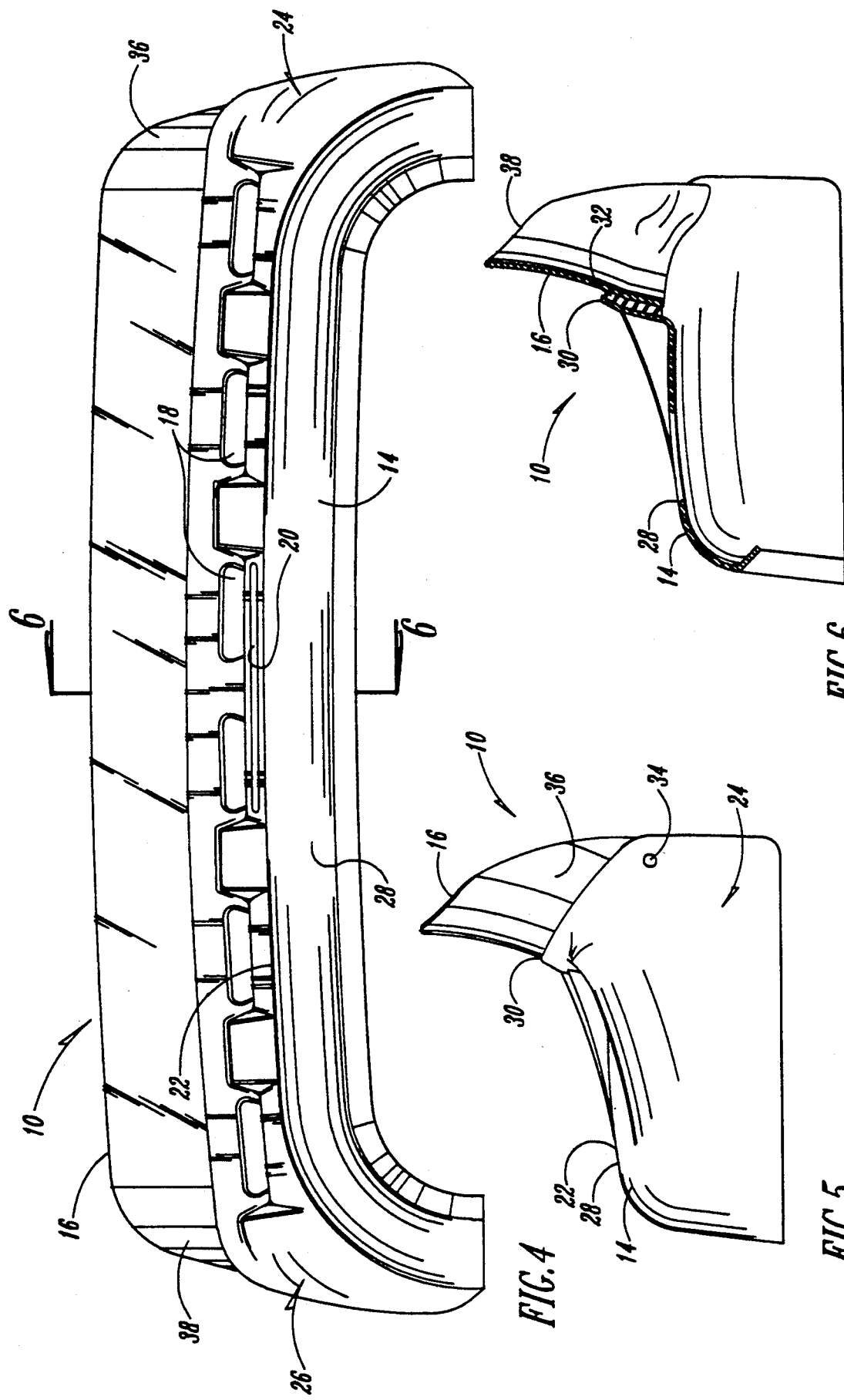

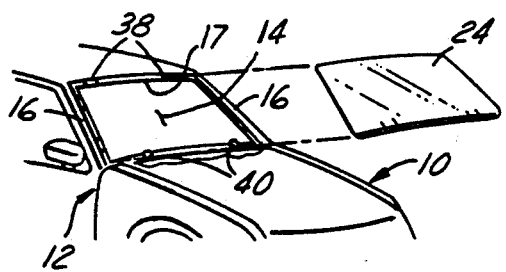
FIG.1
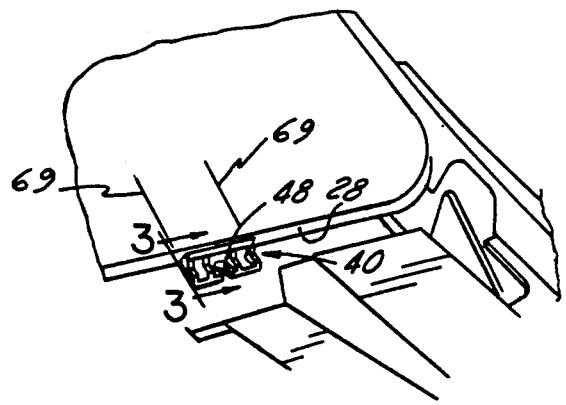
FIG.2
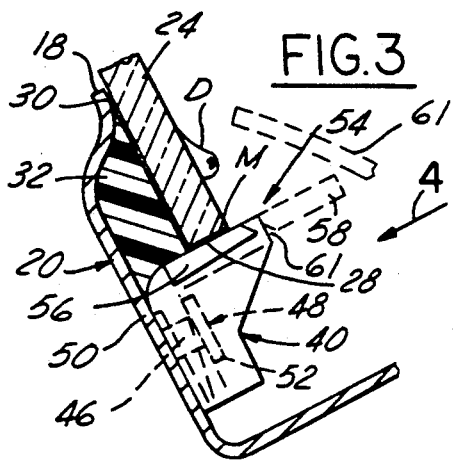
FIG.3
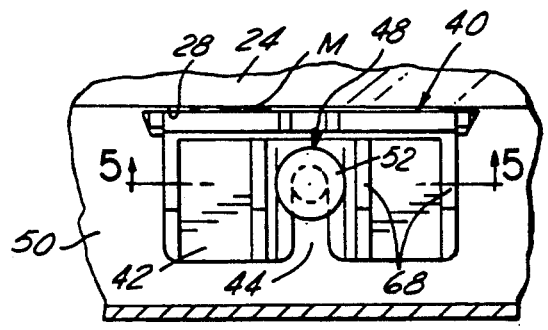
FIG.4
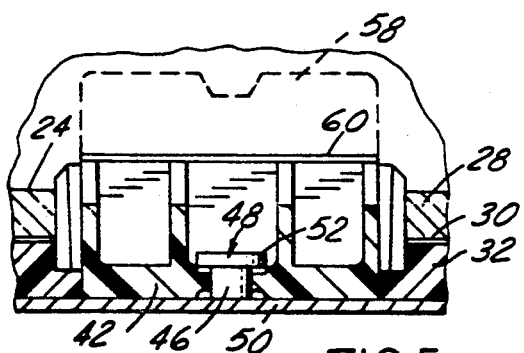
FIG.5
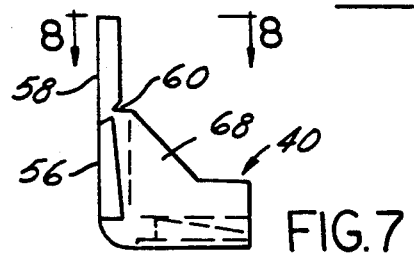
FIG.7
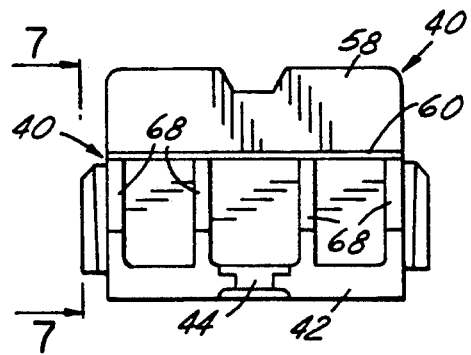
FIG.6
FIG.8

HEAVY TRUCK BUG AND GRAVEL SHIELD

BACKGROUND OF THE INVENTION

This invention relates to a heavy duty bug and gravel shield assembly, especially designed for over-the-road trucks.

Many types of bug and gravel shield deflectors have been devised for motor vehicles, to both protect a vehicle windshield and to deflect debris and other foreign material away from impact on the shield. For the most part, these shields involve some sort of mounting bracket from which a shield extends either generally vertically upward or slightly rearwardly and upward. The shield is usually attached to the bracket, with the bracket itself being attached to the hood of the vehicle. Typical shields are represented by Redman, U.S. Pat. No. 4,153,129, and Thornburg, U.S. Pat. No. 3,015,517. While such shields are highly satisfactory for cars, there are special problems in designing shields for heavy, over-the-road trucks.

Heavy, over-the-road trucks require a much more durable, stronger, and tougher shield, primarily because of the excessive vibration energy that is transmitted to the shield and its holding brackets. This excessive vibration will often cause conventional shields to fail.

In the past, there have been some attempts at especially designed truck deflector shields, see for example U.S. Pat. No. 4,627,657, which relates to a shield mounted to a base that is especially adapted for attachment along the upper grill edge of a truck. Even with prior mounting systems, the continuing vibration and the multiplicity of parts, result in a high incidence of shield failure.

One of the ways to eliminate shield failure is, of course, to minimize the number of parts, and to design a shield mounting system which is not susceptible to failure as a result of high vibrations.

The present invention represents an improvement over the prior art in providing a shield of aerodynamically superior configuration, a shield which has a minimum of parts, one which has a base which fits in covering and conforming relationship to the front of the hood and to the top of a truck grill in a sort of "wrap-around" manner, and a shield designed such that the vibration energy is dissipated throughout the wrap-around base portion.

Accordingly, a primary objective of the present invention is to provide a truck shield which is comprised of minimum parts that dissipates vibration energy.

Another objective of the present invention is to provide a truck shield which dissipates vibration energy through the entire base portion, thus eliminating vibration caused failures for the shield and the attachment means of the shield to the hood.

Another objective of the present invention is to provide a shield which is aerodynamically superior and provides air flow under the shield. This improves the deflecting performance of the shield and prevents disruption of airflow to the engine from the air intake at the back of the hood. It also aids in proper windshield wiper performance.

Another objective of the present invention is to provide an attractive shield of durable configuration and of economic manufacture and ease of installation as a result of minimized parts.

A still further objective is to protect the front edge of the hood from debris damage.

The method and means of accomplishing each of the above objectives will become apparent from the detailed description of the invention which follows hereinafter.

SUMMARY OF THE INVENTION

A heavy duty truck bug and gravel shield assembly comprising a base portion which adsorb vibration energy and which is of covering and conforming relationship to the front end of the hood of a truck and to the top of the grill, and an associated shield portion attached thereto to deflect air upwardly and over a truck windshield. Because of the conforming relationship of the base portion, and the nature of its contours, only a very few fasteners are needed to hold it securely to the hood.

BRIEF DESCRIPTION OF THE DRAWINGS

FIG. 1 is a perspective view of the truck deflector shield assembly, illustrating how it is attached in relation to the grill and hood portion of a truck.

FIG. 2 is an elevated rear view of the shield.

FIG. 3 is a top plan view of the shield.

FIG. 4 is an elevated front view of the shield.

FIG. 5 is an elevated side view of the shield.

FIG. 6 is a sectional view along line 6—6 of FIG. 4.

DETAILED DESCRIPTION OF THE INVENTION

Referring in detail to the drawings, there is shown in FIG. 1 the bug and gravel shield 10, mounted on a conventional truck 12, directly above the grill and in conforming covering relationship to part of the grill and part of the hood. The bug and gravel shield assembly 10 is comprised of a base portion 14, a unitary shield portion 16 and attachment means of conventional construction (not depicted).

Looking first at the base portion 14, it is comprised of a moldable heat settable polymer plastic material, such as ABS (the material is well known). Other suitable thermoset blow moldable polymeric plastic materials can also be used. The base portion has a series of spaced apart vents 18 along its top and a central vent 20 dwelling in the midportion of base 14. Spaced apart vents 18 and midpoint vent 20 allow air intake behind the shield to prevent an undesirable vacuum from building up behind the shield. As a result, air flow is superior under and over the shield and improves the deflecting height of the fast rushing air, which is not only up and away from the front of the shield 16, but up and away from the air passing through vents 18 and 20. The base portion 14 has a substantially horizontal portion 22 terminating in a pair of like configured side edges 24 and 26, which curve downwardly contouring to the relationship between the hood and truck panels. This results in a more stream lined contour of the base portion and a more aerodynamically suitable base portion. Horizontal portion 22 gradually elevates from its front edge 28 to its rear edge 30. In this manner, the entire configuration of base portion 14 is streamline in appearance, is aerodynamically sound and is consistent with the moving of rushing air, and elimination of vibration. What vibration is caused is adsorbed into base portion 14 rather than shield 16.

Shield 16 is mounted to the upper rear edge 30 of base portion 14 conventionally, such as by pressure sensitive adhesive tape 32 normally used for car moldings. These pressure tapes are generally known and commercially available. Other attachment means could also be provided, but generally an adhesive providing cushioning and adhesive attachment, is preferred. This again minimizes vibration influence and will prevent cracking of shield 16. Preferably at the sides 24 & 26 fasteners 34 attach shield 16 and base 14.

Shield 16 comprises an elongated, unitary, preferably translucent or transparent durable material, such as acrylic plastic or polycarbonate plastic such as G.E., Lexan ® or like materials. As illustrated, shield 16 has no angular bends, instead, being of conforming relationship to top rear edge 30 of base 14, in a generally or substantially straight center portion terminating in a pair of rearwardly curved wing portions 36 and 38. Wings 36 and 38, as depicted, wrap around the edges and extend downwardly and rearwardly to ultimately conform to the edge 30 of base portion 14, as best depicted in FIG. 5. Again, in this manner, an aerodynamic configuration is achieved.

In actual operation, the device works in the following manner. Shield assembly 10 is brought to the front of the hood of truck 12 and placed in conforming relationship over it, attached at a few locations by conventional means (nondepicted) and is ready for use. Alternatively molding type adhesive tape may be used. When the truck is moving forward air rushes upwardly and over base portions 14 and shield 16. This deflects debris upwardly and over, consistent with the shield contour, to miss the truck windshield. Additionally, air passes through spaced apart vents 18 and midpoint vent 20, preventing a vacuum buildup behind the shield. In this manner, deflecting properties are maximized and vibrations of the shield minimized.

It can therefore be seen that the construction of the heavy duty truck shield used herein, accomplished each of the stated objectives of the invention. Various modifications and changes may be made in the specific construction and arrangement of the parts, without departing from the spirit and scope of the invention as claimed.

What is claimed:

1. A heavy duty truck bug and gravel shield assembly, comprising:
   a base portion adapted for covering and conforming relationship over the top front end portion of the grill and hood of an over-the-road truck, said grill having a front and opposing vertical sides and said base portion wrapping over said hood and then vertically downward over said sides of said grill;
   a shield portion comprised of a unitary durable but flexible plastic material having top and bottom edges, with the bottom edge mounted to said base portion; and
   means to detachably mount said base portion to the front end hood of said over-the-road truck.

2. The bug and gravel shield assembly of claim 1 wherein the base portion has air vents.

3. The bug and gravel shield assembly of claim 1 wherein the base portion has a central vent.

4. The bug and gravel shield assembly of claim 1 wherein the base portion is of polymeric plastic material, which adsorbs vibration energy.

5. The bug and gravel shield assembly of claim 1 wherein the base portion and the shield portion are mounted together by an attaching energy adsorbing adhesive tape material.

6. The bug and gravel shield unit of claim 1 wherein the base portion is ABS plastic, and the shield is Lexan ®.

7. The bug and gravel shield of claim 6 wherein the shield is transparent.

8. The bug and gravel shield assembly of claim 1 wherein the base portion is constructed in a single piece.

9. The bug and gravel shield assembly of claim 1 wherein said shield and base portions are mounted together by adhesive means such that said shield is free of surface and cross sectional irregularities constituting stress risers capable of producing cracks in said shield.

10. The bug and gravel shield assembly of claim 1 further comprising a damping means operatively interposed between said shield and base portions for reducing the vibrations transmitted to said shield portion from said base portion.

11. The bug and gravel shield assembly of claim 10 wherein pressure sensitive tape simultaneously serves both as said damping means and an adhesive means for mounting said shield and base portions together.

12. A heavy duty truck bug and gravel shield assembly, comprising:
   a base portion adapted for covering and conforming relationship over the top front end portion of the grill and hood of an over-the-road truck;
   a shield portion comprised of a unitary durable but flexible plastic material having top and bottom edges, with the bottom edge mounted to said base portion;
   means to detachable mount said base portion to the front end hood of said over-the-road truck; and
   adhesive means for mounting together said base portion and shield portion and absorbing energy therefrom.

* * * * *